US008878651B2

(12) United States Patent
Kwak

(10) Patent No.: US 8,878,651 B2
(45) Date of Patent: Nov. 4, 2014

(54) FOOD SOURCE INFORMATION TRANSFERRING SYSTEM AND METHOD FOR A LIVESTOCK SLAUGHTERHOUSE

(71) Applicant: Hana Micron America Inc., Milpitas, CA (US)

(72) Inventor: Sung Bok Kwak, Milpitas, CA (US)

(73) Assignee: Hana Micron America, Inc., Milpitas, CA (US)

( * ) Notice: Subject to any disclaimer, the term of this patent is extended or adjusted under 35 U.S.C. 154(b) by 80 days.

(21) Appl. No.: 13/648,229

(22) Filed: Oct. 9, 2012

(65) Prior Publication Data

US 2014/0097940 A1    Apr. 10, 2014

(51) Int. Cl.
*H04Q 5/22* (2006.01)
*G08B 23/00* (2006.01)
*A22C 18/00* (2006.01)
*A22B 7/00* (2006.01)

(52) U.S. Cl.
USPC ............... 340/10.1; 340/573.1; 340/573.3; 452/157; 452/52

(58) Field of Classification Search
CPC ......... G06K 7/10366; G06K 7/10386; G06K 7/10425
USPC ............. 340/10.1, 573.1, 573.3; 452/157, 52
See application file for complete search history.

(56) References Cited

U.S. PATENT DOCUMENTS

| | | | | |
|---|---|---|---|---|
| 6,097,290 | A * | 8/2000 | Balfour | 340/545.1 |
| 6,231,435 | B1 * | 5/2001 | Pilger | 452/157 |
| 7,591,718 | B2 * | 9/2009 | Crane | 452/52 |
| 8,478,195 | B1 * | 7/2013 | Hewinson | 455/41.1 |
| 2003/0062001 | A1 | 4/2003 | Andersson | |
| 2006/0145814 | A1 * | 7/2006 | Son et al. | 340/10.1 |
| 2012/0012069 | A1 * | 1/2012 | Hempstead et al. | 119/712 |
| 2012/0161645 | A1 * | 6/2012 | Dingemans et al. | 315/153 |
| 2012/0182124 | A1 * | 7/2012 | Joannes | 340/5.65 |
| 2014/0014714 | A1 * | 1/2014 | Tang | 235/375 |

* cited by examiner

*Primary Examiner* — George Bugg
*Assistant Examiner* — Munear Akki
(74) *Attorney, Agent, or Firm* — Invent Capture, LLC; Samuel S. Cho

(57) ABSTRACT

A food source information transferring system for a livestock slaughterhouse and a related method are disclosed. In one embodiment, the food source information transferring system is capable of reading first tag-identifying information in a livestock RFID tag on a body of a carcass and second tag-identifying information in a hook RFID tag incorporated in a hook that can be hung on a hook machine. A food source information database can pair a first set of data associated with the livestock RFID tag with a second set of data associated with the hook RFID tag to preserve producer-level livestock information to meat-processing, distribution, and sales channels. This unique pairing of the first set of data associated with the livestock RFID tag and the second set of data associated with the hook RFID tag in the food source information database can result in seamless, robust, and lossless food source information management.

19 Claims, 11 Drawing Sheets

A slaughterhouse process flow for food source information pairing

A slaughterhouse process flow for food source information pairing

200

Two types of hooks incorporating hook RFID tags

| LIVESTOCK TAG NUMBER: | STATUS: |
|---|---|
| A618208 | 3 |
| HOOK TAG NUMBER: C200402 ||

300

An embodiment of at least a portion of paired food source
information displayed on a display panel in a slaughterhouse

FIG. 3

An embodiment of a refrigerator in a meat processing facility

An embodiment of at least a portion of paired food source information displayed on a display panel associated with a refrigerator A high-level device connection diagram for a food source information transferring system

700

| 901 | 903 | 905 | 907 | 909 | 911 | 913 |
|---|---|---|---|---|---|---|
| Livestock Tag ID | Type | DOB | Gender | Owner | Vaccine Records | Animal Weight |
| A618208 | Premium | 7/17/2010 | F | KC Farms | | 1140 lbs |

900

An example of data associated with a livestock (RFID or paper) tag

| 917 | 919 | 921 | 923 |
|---|---|---|---|
| Hook RFID Tag ID | Slaughterhouse / Plant ID | Livestock Tag ID | Status Information |
| C200402 | Midranch Co. #3 | A618208 | |

915

An example of data associated with a hook RFID tag

A data association example of of a livestock tag and hook RFID tags

1001B

A data association example of multiple livestock tags and hook RFID tags

1000

FOOD SOURCE INFORMATION TRANSFERRING SYSTEM AND METHOD FOR A LIVESTOCK SLAUGHTERHOUSE

BACKGROUND OF THE INVENTION

The present invention generally relates to food source information tracking and transferring systems and methods. More specifically, the present invention relates to food source information transferring system and method for a livestock slaughterhouse. Furthermore, the present invention also relates to transferring and pairing food source information from livestock animal tags to radio frequency identification (RFID) tags designed for hooks to hold and transport animal carcasses in a livestock slaughterhouse.

Conventional food source information tracking methods from a livestock farm to meat processing and distribution chains often lack a desirable level of transparency, data robustness, and data security. In conventional food source information tracking methods, food source information originating from a particular livestock farm is often lost, corrupted, or compromised in meat processing and distribution channels such as livestock slaughterhouses and meat-packing facilities. For example, as paper tags or livestock animal RFID tags are removed from animal carcasses on a hook machine in a livestock slaughterhouse, much of the original food source information contained on the paper tags or livestock animal RFID tags are lost, corrupted, or compromised as each carcass undergoes meat processing and chopping operations. In some cases, only the country of origin or the state of origin may remain as a single piece of retained information by the time meat is processed and transported out of the livestock slaughterhouses.

In many cases, conventional food source information tracking methods undermine and compromise data security and data integrity when food source information is transferred from one meat production or processing operation to another meat production or processing operation, because much of the information transfer process is manual and labor-intensive without automated and secure data transfer mechanism. For example, conventional paper tags require hand transcriptions to transfer data from one operation to another, while conventional long-frequency (LF) RFID tags merely provide an undesirably short tag-reading distance that hampers implementation of a high-throughput, automated, and secure food source information transferring mechanism.

Moreover, in recent years, outbreak control and containment of contagious diseases and epidemics have become an important concern in modern livestock farming industry. If contagious livestock diseases or epidemics are discovered after meat is already processed and distributed, accurately tracing the sources of meat products that may have been impacted by the contagious livestock diseases or epidemics is a challenging task when only high-level food source information, such as the country or the state of origin, is retained in processed meat packages. Conventional meat product tracing methods for reduction of public health risks do not typically provide a fine level of detail or pinpoint accuracy to prevent distribution or sale of the dangerous meat products efficiently. For example, meat products from a particular country or a state may be entirely discarded or banned as a group, even if the source of contagious livestock diseases or epidemics may have been limited to one particular livestock farm, one particular slaughterhouse, or one particular meat-packing facility among hundreds of meat processing and distribution channels in that country or state. The lack of fine details in food source information as well as the lack of data transparency and security in conventional food source tracking methods often necessitate mass disposal of meat products and import bans from an entire country or a state.

Furthermore, the lack of fine details in food source information in conventional food source information tracking methods also make accurate tracking of livestock transactions throughout meat processing and distribution channels difficult for local, state, and national governments. The lack of transactional data transparency among livestock farms, slaughterhouses, meat-packing facilities, and distribution channels impede governments from providing helpful oversight and effective agricultural policies. The governments may also find accurate taxation on livestock transactions difficult due to the lack of transactional data accuracy and transparency in meat processing and distribution channels.

Therefore, it may be beneficial to provide a food source information transferring system in a livestock slaughterhouse that can accurately, securely, and electronically pair livestock farm-level information on each animal with all useful pieces of subsequently-processed carcasses on a hook machine. Furthermore, it may also be beneficial to provide a method of transferring and tracking food source information between livestock tags and subsequently-processed carcasses on a hook machine. In addition, it may also be beneficial to devise a holistic information technology (IT) infrastructure at various levels of meat processing and distribution chains for systematic and robust management of food source information.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a food source information transferring system for a livestock slaughterhouse is disclosed. This food source information transferring system comprises: a data scan zone defined by an RFID signal projection from an RF antenna operatively connected to an RFID reader; a hook RFID tag incorporated or embedded in a hook that holds an animal carcass when the hook is hung on a hook machine, wherein the hook machine is designed to transport the animal carcass on the hook from one location to another location; the RFID reader configured to read from or write to the hook RFID tag when the hook RFID tag is inside the data scan zone, wherein the RFID reader is further configured to read from or write to a livestock RFID tag attached to a body of the animal carcass when the animal carcass is also inside the data scan zone; a food source information database operating on a CPU and a memory unit of a computer system device which is operatively connected to the RFID reader, wherein the food source information database is configured to pair a first set of data associated with the livestock RFID tag and a second set of data associated with the hook RFID tag; and a slaughterhouse operation controller unit operatively connected to the RFID reader and the food source information database, wherein the slaughterhouse operation controller unit at least partially controls the RFID reader and the food source information database.

In another embodiment of the invention, a method of transferring food source information from livestock producer-level food source data to slaughterhouse-level food source data is disclosed. This method comprises the steps of: transporting an animal carcass with a livestock tag to a hook machine; placing the animal carcass to the hook machine with a hook containing a hook RFID tag; bringing the animal carcass on the hook machine to a data scan zone in a slaughterhouse; reading the livestock tag with an RF antenna and an RFID reader operatively connected to a food source information database if the livestock tag is a livestock RFID tag, or fetching information on the livestock tag and entering the fetched information into the food source information database if the livestock tag is a paper tag; reading the hook RFID tag with the RF antenna and the RFID reader operatively connected to the food source information database; pairing a first set of information read from the livestock tag with a second set of information read from the hook RFID tag; and if the pairing of the first set of information and the second set of information is determined to be successfully completed, storing a status code and the paired information in the food source database.

BRIEF DESCRIPTION OF DRAWINGS

FIG. 3 shows at least a portion of paired food source information displayed on a display panel in a slaughterhouse, in accordance with an embodiment of the invention.

FIG. 9 shows an example of data associated with a livestock tag and an example of data associated with a hook RFID tag, in accordance with an embodiment of the invention.

DETAILED DESCRIPTION

Figure 1:
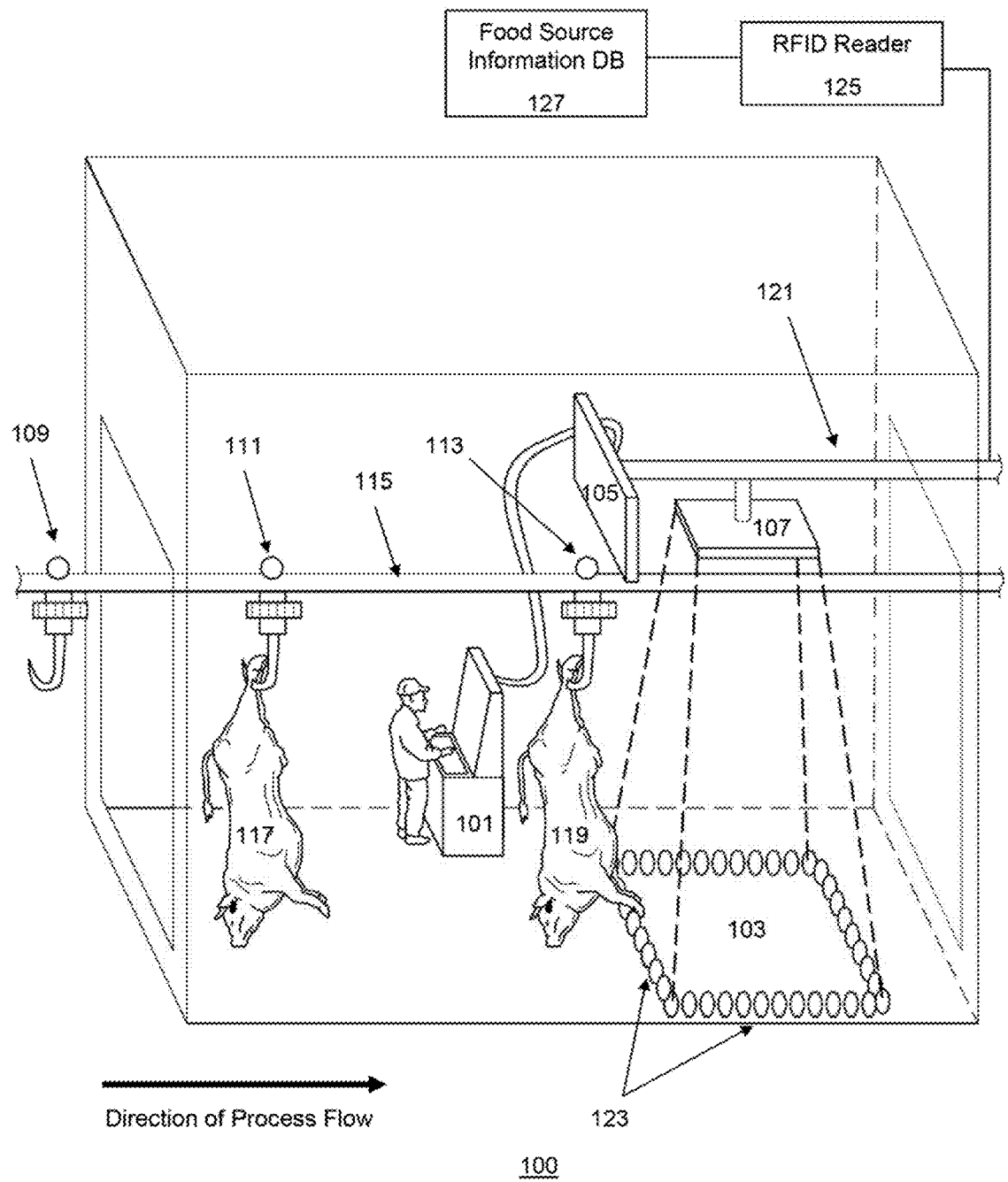
FIG. 1 shows a perspective view of a slaughterhouse and its process flow for food source information transfer and pairing, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble a food source information transferring system and a related method for a livestock slaughterhouse. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "livestock" is defined as farm animals raised for use and/or profit. The term "livestock" can include, but are not limited to, cattle, sheep, pigs, goats, horses, donkeys, mules, and poultry (e.g. chickens, ducks, turkeys, and geese).

In addition, for the purpose of describing the invention, a term "carcass" is defined as a body of a slaughtered farm animal for human consumption or for other food or industrial use. For example, a carcass may be a dead body of a cattle, a sheep, a pig, a goat, a horse, a donkey, a mule, or poultry (e.g. a chicken, a duck, a turkey, or a goose).

Furthermore, for the purpose of describing the invention, a term "slaughterhouse" is defined as a meat-processing facility in which livestock animals are slaughtered and processed as usable and/or edible carcasses. A slaughterhouse may also integrate a refrigerator or a refrigeration facility to chill and store usable and/or edible carcasses for a particular period prior to subsequent meat processing, chopping, and packing operations.

In addition, for the purpose of describing the invention, "a hook machine" is defined as a carcass transport apparatus that can hang or accommodate one or more hooks holding at least a portion of a carcass.

Moreover, for the purpose of describing the invention, a term "epidemic" and a term "contagious disease" are defined as an infectious disease for animals and/or humans, wherein the infectious disease may spread by physical contact, air, liquid, ingestion, or another method of disease transmission.

In addition, for the purpose of describing the invention, a term "radio frequency identification," or RFID, is defined as a wireless signal-based identification of a wirelessly-accessible tag, called an "RFID tag" using a wirelessly-accessible tag reader, called "RFID reader." In general, an RFID tag contains information which may be written and/or read by the RFID reader, an RF antenna operatively connected to the RFID reader, or another tag information access device. In a preferred embodiment of the invention, RFID operates in ultra high frequencies (UHF) to achieve longer read/write ranges (e.g. up to several meters) and multiple tag read/write capabilities, which were difficult to achieve in conventional low frequency (LF)-based RFID devices exhibiting shorter read/write ranges (e.g. approximately up to 30 centimeters) and single tag scan functionalities. In a preferred embodiment of the invention, the UHF range for the RFID reader is defined by ISO/IEC 18000-6 air interface standard, which utilizes an operating frequency range of 860 MHz~960 MHz. In another embodiment of the invention, the UHF operating frequency range may be defined more broadly as 300 MHz~3 GHz. In general, the conventional LF operating frequencies are below the UHF RFID tag reader operating frequency ranges.

Furthermore, for the purpose of describing the invention, a term "food source information database" is defined as a data bank comprising food source-related data. For example, a food source information database may contain multiple levels of food source information from livestock production, meat processing, and distribution chains, wherein the multiple levels of food source information can be traced to a particular livestock farm, a particular livestock slaughterhouse, a meat-packing facility, a particular distribution channel, and/or another entity in livestock production, meat processing, and distribution chains. In a preferred embodiment of the invention, the food source information database operates on a CPU and a memory unit of a computer server or another computing system device.

In addition, for the purpose of describing the invention, a term "pairing" or a variation of this word is defined as linking or associating one set of data with another set of data. For example, if a livestock RFID tag is "paired" with a hook RFID tag, a set of data related to the livestock RFID tag is linked or associated with another set of data related to the hook RFID tag.

One aspect of an embodiment of the present invention is providing a food source information transferring system with RFID technology and a food source information database operatively connected to a livestock slaughterhouse.

Another aspect of an embodiment of the present invention is providing a method of a food source information transferring system with RFID technology and a food source information database operatively connected to a livestock slaughterhouse.

Yet another aspect of an embodiment of the present invention is creating and managing a substantially-automated food source information transferring system and a related method across livestock farming, meat processing, and meat distribution and sales chains.

In addition, another aspect of an embodiment of the present invention is providing a system and a method for holistically tracing and tracking food source information across livestock farming, meat processing, and meat distribution and sales chains to identify and manage any epidemic or contagious disease outbreak efficiently and effectively.

Furthermore, another aspect of an embodiment of the present invention is providing a system and a method for accurately tracking the quantity of transactions within livestock farming, meat processing, and meat distribution and sales chains for local, state, and national governments to provide effective oversight and implement necessary policy changes.

FIG. 1 shows a perspective view of a slaughterhouse (100) and its process flow for food source information transfer and pairing, in accordance with an embodiment of the invention. In a preferred embodiment of the invention, the slaughterhouse (100) has a hook machine (115) configured to hang and mobilize a plurality of hooks (109, 111, 113) incorporating novel hook RFID tags. As shown in FIG. 1, each hook (109, 111, or 113) is configured to hold an animal carcass (117 or 119), which moves through the direction of process flow. For example, as shown in FIG. 1, a first hook (113) with a hook RFID tag has a first carcass (119) attached to the first hook (113). Likewise, a second hook (111) with a hook RFID tag has a second carcass (117) attached to the second hook (111). A third hook (109) with a hook RFID tag does not have any carcass attached in this particular example. In the embodiment of the invention as shown in FIG. 1, all three hooks (109, 111, 113) are moving towards the direction of process flow to enter a data scan zone (103), one hook at a time. In one embodiment of the invention, the data scan zone (103) utilizes UHF RFID technology, and is approximately three meters in length and three meters in width. In another embodiment of the invention, the dimension of the data scan zone (103) may be dynamically adjustable via a slaughterhouse operation controller (101) operatively connected to an RF antenna (107). Yet in another embodiment of the invention, the data scan zone (103) may be configured in a particular dimension based on a particular requirement in a slaughterhouse operation.

In a preferred embodiment of the invention, a carcass has an RFID livestock ear tag or another form of RFID livestock tag attached to the body of the carcass. In the particular example as shown in FIG. 1, when each carcass (119 or 117) attached to its corresponding hook (113 or 111) enters the data scan zone (103), an RF antenna (107) and an RFID reader (125) operatively connected (i.e. 121) to the RF antenna (107) reads tag-identifying information, such as an RFID tag ID, stored in the RFID livestock tag attached to the body of the carcass. In the preferred embodiment of the invention, a food source information database (127) is configured to retrieve livestock tag-related data associated with the tag-identifying information of the RFID livestock tag. Then, the RFID reader (125) and the RF antenna (107) reads tag-identifying information of a hook RFID tag on each hook (113 or 111), and pairs the tag-identifying information of the hook RFID tag on each hook to the retrieved livestock tag-related data associated with the tag-identifying information of the RFID livestock tag. At this point, the paired food source information between the RFID livestock tag and the corresponding hook RFID tag can be stored in the food source information database (127) for subsequent data associations and retrieval in other stages of meat processing, distribution, or inspection. This data pairing between the RFID livestock tag and the corresponding hook RFID tag is a novel aspect of one or more embodiments of the invention, wherein the data pairing between the RFID livestock tag and the corresponding hook RFID tag ensures seamless and largely-automated information linking between the livestock farm-level food source information and the slaughterhouse-level food source information.

Continuing with FIG. 1, in a preferred embodiment of the invention, the data scan zone (103) is surrounded and/or defined by indicator lights (123), which may be switched on or flash when a hook (e.g. 113) and its attached carcass (e.g. 119) moves into the data scan zone (103). The activation of the indicator lights (123) may assist a human operator on the slaughterhouse operation controller unit (101) to realize that a hook RFID tag and/or an RFID livestock tag are getting scanned correctly or can be scanned correctly by the RF antenna (107) and the RFID reader (125). The human operator and/or the slaughterhouse operation controller unit (101) may also have the ability to control the speed of the process flow and the speed of data scanning in the data scan zone (103).

Furthermore, in the preferred embodiment of the invention, the human operator can also watch real-time pairing of food source information displayed on a display panel (105) in the slaughterhouse (100), and verify or confirm the validity of the paired data by authorizing a correct status code entry, which can also be displayed on the display panel (105). An example of information which may be displayed on the display panel (105) in the slaughterhouse (100) in accordance with an embodiment of the invention is also illustrated by FIG. 3.

In an alternative embodiment of the invention, a carcass (e.g. 119) attached to a hook (e.g. 113) operating on a hook machine (e.g. 115) may have a paper livestock tag attached to an ear of the carcass or another part of the carcass, instead of an RFID livestock tag attached to the carcass. In this alternative embodiment of the invention, the data scan zone (103) may utilize a device, a mechanism, or a human personnel to fetch and/or transcribe information from the paper livestock tag before electronically pairing the fetched and/or transcribed livestock farm-level information with the slaughterhouse-level data associated with a hook RFID tag. In this alternative embodiment of the invention, the hook RFID tag incorporated on the hook (113) is still scanned electronically by the RFID antenna (107) operatively connected (i.e. 121) to the RFID reader (125) for data association between the fetched and/or transcribed livestock farm-level information and the slaughterhouse-level data associated with the hook RFID tag. The associated data can then be stored in the food source information database (127) for subsequent data associations and retrieval in other stages of meat processing, distribution, or inspection.

Figure 2:
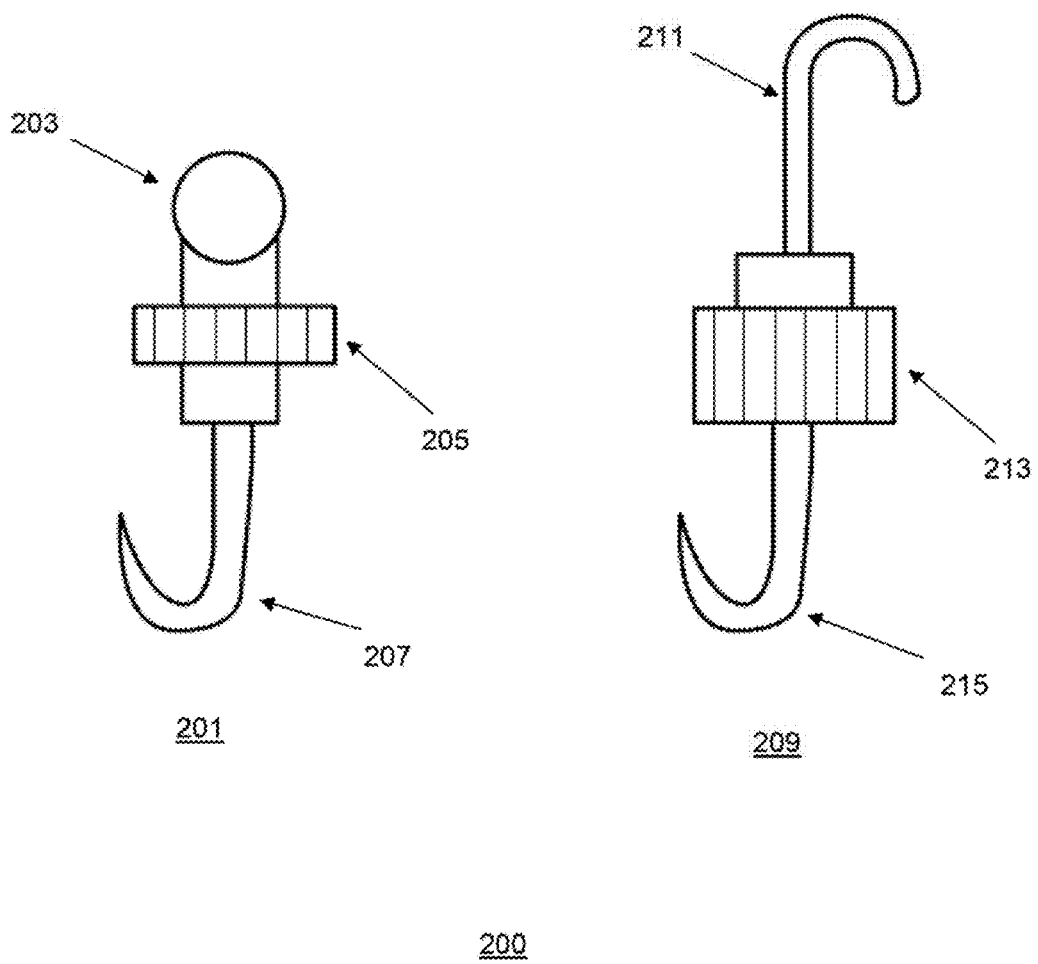
FIG. 2 shows two types of hooks that incorporate hook RFID tags in accordance with an embodiment of the invention.

FIG. 2 shows two types (201, 209) of hooks (200) that incorporate hook RFID tags (205, 213) in accordance with an embodiment of the invention. In one embodiment of the invention, a first hook type (201) with a first hook machine hanger (203) and a first carcass hanger (207) also incorporates a first hook RFID tag (205). The first hook machine hanger (203) for the first hook type (201) may be sphere-shaped, and is configured to be securely hung on a hook machine. The first carcass hanger (207) for the first hook type (201) is configured to hold an animal carcass with its hook-shaped tip, wherein both the first hook machine hanger (203) and the first carcass hanger (207) on the first hook type (201) are able to support the weight of the animal carcass during transport on the hook machine. Preferably, the first hook RFID tag (205) is a metal UHF RFID tag that can be accessed by a corresponding RF antenna operatively connected to a UHF RFID reader in a data scan zone (e.g. 103 in FIG. 1).

Furthermore, in a preferred embodiment of the invention, the first hook RFID tag (205) is a battery-less (i.e. without a battery) "passive" tag, which typically comprises a non-volatile memory unit and an RF tag antenna encapsulated by a weather-resistant covering. The RF tag antenna in the first hook RFID tag (205) is configured to receive an electromagnetic signal from an RFID antenna (e.g. 107 of FIG. 1) to energize the non-volatile memory unit inside the first hook RFID tag (205) to transmit information from or send information to the non-volatile memory unit. In another embodiment of the invention, the first hook RFID tag (205) may be a battery-powered "active" tag.

In another embodiment of the invention, a second hook type (209) with a second hook machine hanger (211) and a second carcass hanger (215) also incorporates a second hook RFID tag (213). The second hook machine hanger (211) for the second hook type (209) may be hook-shaped, and is configured to be securely hung on a hook machine. The second carcass hanger (215) for the second hook type (209) is configured to hold an animal carcass with its hook-shaped tip, wherein both the second hook machine hanger (211) and the second carcass hanger (215) on the second hook type (209) are able to support the weight of the animal carcass during transport on the hook machine. Preferably, the second hook RFID tag (213) is a metal UHF RFID tag that can be accessed by a corresponding RF antenna operatively connected to a UHF RFID reader in a data scan zone (e.g. 103 in FIG. 1).

Furthermore, in a preferred embodiment of the invention, the second hook RFID tag (213) is a battery-less (i.e. without a battery) "passive" tag, which typically comprises a non-volatile memory unit and an RF tag antenna encapsulated by a weather-resistant covering. The RF tag antenna in the second hook RFID tag (213) is configured to receive an electromagnetic signal from an RFID antenna (e.g. 107 of FIG. 1) to energize the non-volatile memory unit inside the second hook RFID tag (213) to transmit information from or send information to the non-volatile memory unit. In another embodiment of the invention, the second hook RFID tag (213) may be a battery-powered "active" tag.

FIG. 3 shows at least a portion of paired food source information displayed on a display panel (300) in a slaughterhouse, in accordance with an embodiment of the invention. In a preferred embodiment of the invention, the display panel (300) in the slaughterhouse has an identical or similar configuration as shown in FIG. 1, with a slaughterhouse operation controller (e.g. 101 of FIG. 1) operatively connected to the display panel (300 or 105 of FIG. 1), an RF antenna (e.g. 107 of FIG. 1), an RFID reader (e.g. 125 of FIG. 1), and a food source information database (e.g. 127 of FIG. 1).

Furthermore, in the preferred embodiment of the invention, a human operator can monitor and control real-time pairing of food source information in a data scan zone by checking a current reading of the livestock RFID or paper tag identification number or alphanumeric code (e.g. A618208) and a current hook RFID tag identification number or alphanumeric code (e.g. C200402) displayed on the display panel (300) in the slaughterhouse. The human operator can also verify or confirm the validity and the current status of the paired data by authorizing a correct status code entry, which is illustrated on the display panel (300) in FIG. 3. In one embodiment of the invention, status code definitions that can be associated with the paired livestock tag and hook RFID tag information include, but are not limited to, "no carcass," "unsuccessful data pairing," and "duplicated pairing attempt." These status code definitions may be given numerical status codes, such as 1, 2, and 3, or alphanumeric status codes, such as "NC" (no carcass), "UDP" (unsuccessful data pairing), and "DPA" (duplicated pairing attempt).

Figure 4:
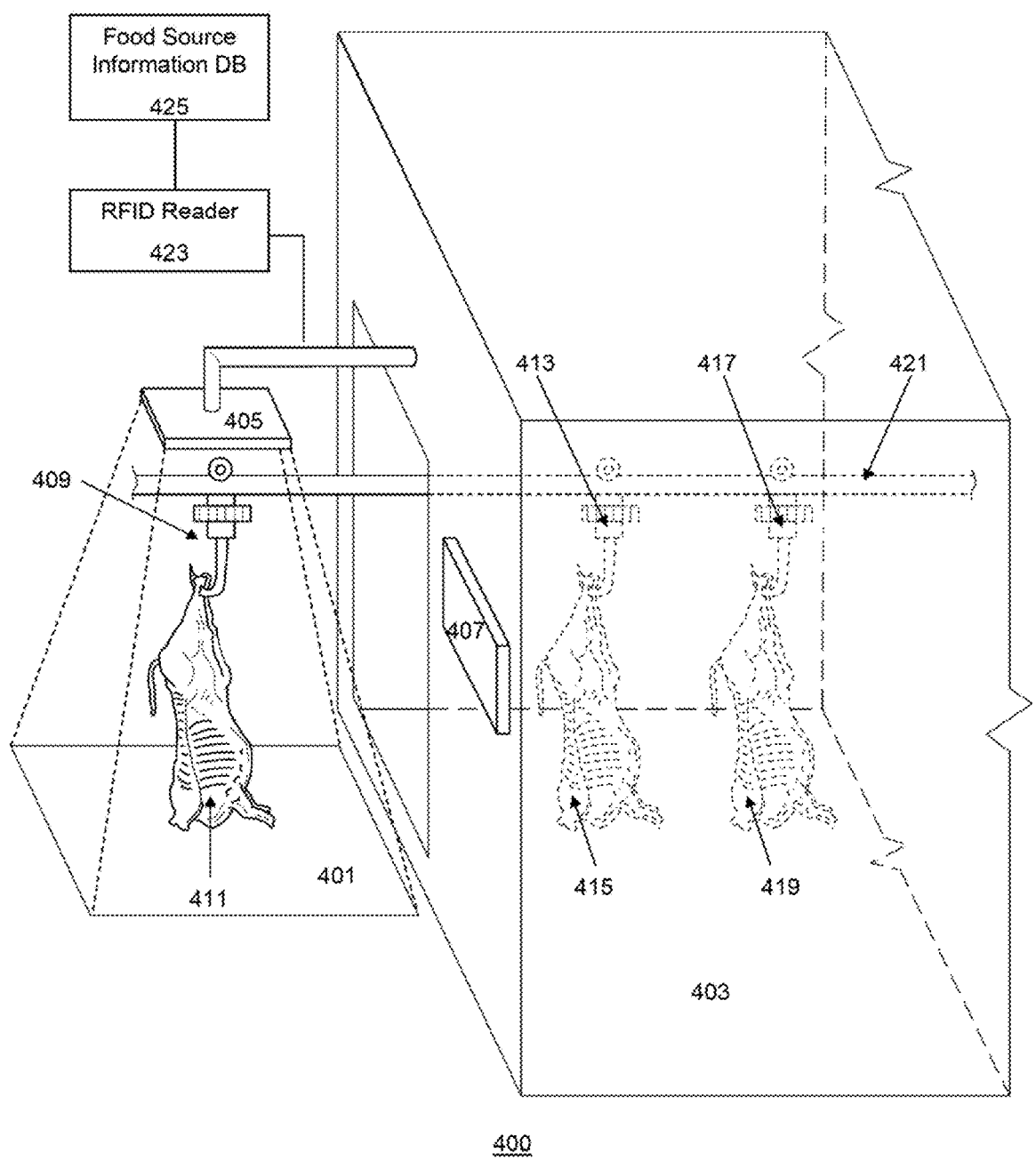
FIG. 4 shows a refrigerator in a meat processing facility in accordance with an embodiment of the invention.

FIG. 4 shows a refrigerator (400) in a meat processing facility in accordance with an embodiment of the invention. In a preferred embodiment of the invention, one or more processed carcasses (411, 415, 419) from a livestock slaughterhouse (e.g. the slaughterhouse shown in FIG. 1) are transported and stored in the refrigerator (400) for a specific period of time prior to meat-chopping and meat-packing operation at a meat-packing facility. The storage of the processed carcasses (411, 415, 419) generally involves a few days or more, depending on a specific condition or quality that a meat processor is trying to accomplish, using a particular temperature level in the refrigerator and the storage period prior to subsequent meat-chopping and packing operations.

As shown in FIG. 4, in the preferred embodiment of the invention, an entrance area near the refrigerator (400) has an RF antenna (405) operatively connected to an RFID reader (423) and a food source information database (425). In the preferred embodiment of the invention, the food source information database (425) operates on a CPU and a memory unit of a computer server or another computing system device. The RF antenna (405) and the RFID reader (423) enable a data scan zone (401), where a hook RFID tag incorporated in a hook (e.g. 409) hanging on a hook machine (421) can be accessed for data read or write from the RFID tag.

In one embodiment of the invention, if a processed carcass (411, 415, or 419) is inbound to the refrigerator (403), a particular hook RFID tag incorporated in a hook (409, 413, or 417) is scanned in the data scan zone (401) to read tag-identifying information. The scanned tag-identifying information from the particular hook RFID tag is then used to conduct a search in the food source information database (425) to check whether there is any duplicate record of refrigerator entry for the particular hook RFID tag.

If there is no duplicate record of refrigerator entry, then the food source information database (425) may record the current entry of the processed carcass (411, 415, or 419) associated with the particular hook RFID tag and authorize entry to the refrigerator (403). In one embodiment of the invention, the process and/or the result of data retrieval and recordation may be displayed on a display panel (407), an example of which is also illustrated in FIG. 5.

On the other hand, if there is a duplicate record of refrigerator entry, then the food source information database (425) can trigger an alert or a warning flag to a system operator that the current entry of the processed carcass (411, 415, or 419) has a duplicated entry in the food source information database (425). In one embodiment of the invention, this alert or the warning flag may be displayed on the display panel (407), and may also be accompanied by an aural alert. The alert or the warning flag to the system operator may prompt a personnel to verify whether the entry of the alerted or warning-flagged processed carcass (411, 415, or 419) is acceptable or legitimate. Then, the personnel can take an appropriate action to block or revoke entry of the alerted or warning-flagged processed carcass (411, 415, or 419).

Furthermore, in one embodiment of the invention, if a processed carcass (411, 415, or 419) is outbound (i.e. exiting) from the refrigerator (403), a particular hook RFID tag incorporated in a hook (409, 413, or 417) is scanned in the data scan zone (401) to read tag-identifying information. The scanned tag-identifying information from the particular hook RFID tag is then used to conduct a search in the food source information database (425) to retrieve food source information associated with the scanned tag-identifying information. Then, a record of exit for the processed carcass (411, 415, or 419) can be newly associated with the retrieved food source information and subsequently stored in the food source information database (425). If the procedures involving data search, retrieval, processing, and storage are completed without error, then the system operator may be authorized to proceed with taking the processed carcass (411, 415, or 419) out from the refrigerator (403).

Figure 5:
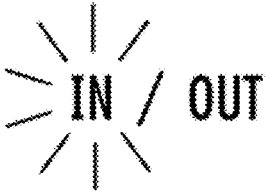
FIG. 5 shows at least a portion of paired food source information displayed on a display panel associated with a refrigerator, in accordance with an embodiment of the invention.

FIG. 5 shows at least a portion of paired food source information displayed on a display panel (500) associated with a refrigerator, in accordance with an embodiment of the invention. In a preferred embodiment of the invention, the display panel (500) in the slaughterhouse has an identical or similar configuration as shown in FIG. 4, with the display panel (e.g. 407 of FIG. 4) operatively connected to an RF antenna (e.g. 405 of FIG. 4), an RFID reader (e.g. 423 of FIG. 4), and a food source information database (e.g. 425 of FIG. 4).

Furthermore, in the preferred embodiment of the invention, a human operator can monitor and control real-time food source information retrieval and recording of a carcass' and its corresponding hook RFID tag's entry and exit in a data scan zone by checking the display panel (500). In the example of the display panel (500) shown in FIG. 5, a human operator can view a total number of hooks (e.g. 500 hooks), today's date (e.g. Jun. 1, 2012), a current hook number or alphanumeric code (e.g. C200413) in the data scan zone, and an entry or exit status with a flashing "IN" sign if the carcass and its corresponding hook RFID tag is entering the refrigerator, and a flashing "OUT" sign if the carcass and its corresponding hook RFID tag is existing the refrigerator. In another embodiment of the invention, the display panel (500) can be configured to display additional or different visual information as needed for carcass transit into or out of the refrigerator.

Figure 6:
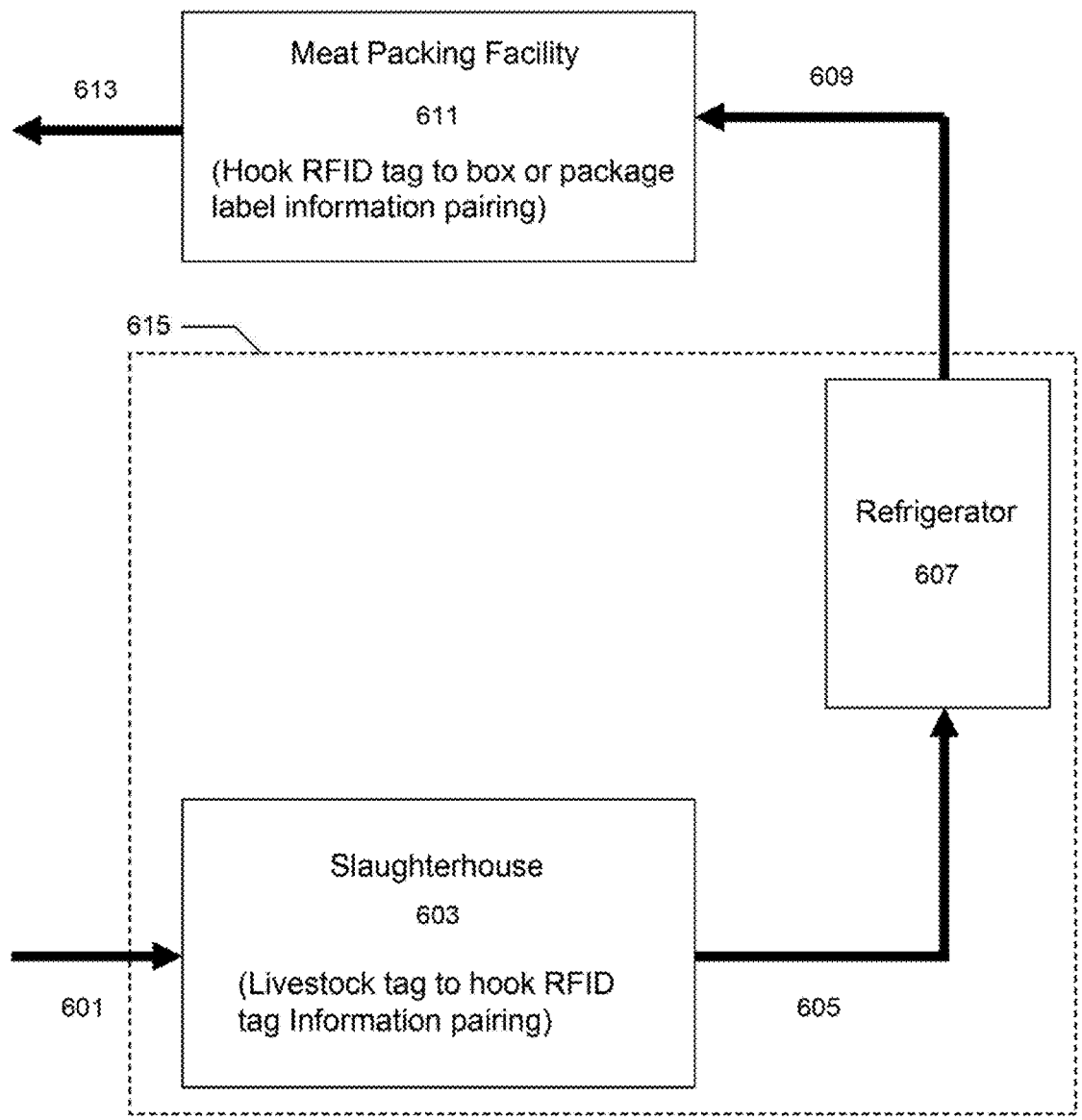
FIG. 6 shows an overview of food source information transfer process in accordance with an embodiment of the invention.

FIG. 6 shows an overview (600) of food source information transfer process in accordance with an embodiment of the invention. In a preferred embodiment of the invention, a perforated section (615) represents food source information pairing, transfer, and management in a slaughterhouse (603) and a refrigerator (607), which have been previously described and illustrated in FIGS. 1~5. As shown in this overview (600), a batch of incoming livestock (601) enters the slaughterhouse (603) and is slaughtered and processed in accordance with local, state, and/or national government regulations. In the preferred embodiment of the invention, each carcass in the slaughterhouse (603) is hung on a hook machine using a hook incorporating a hook RFID tag, and each carcass is then processed sequentially in a data scan zone for food source information pairing between a livestock tag on the carcass and the hook RFID tag incorporated in the hook, as previously shown and described in association with FIG. 1 and FIG. 3.

Once the data pairing between the livestock tag and the hook RFID tag is completed and stored in a food source information database for each carcass, the slaughterhouse (603) performs any additional meat processing, if necessary, and transports (i.e. 605) each processed carcass to a refrigerator (607) using a hook machine or another transport device. Then, in the preferred embodiment of the invention, each processed carcass on a hook undergoes a hook RFID tag-reading and data-checking procedure in a data scan zone near an entrance door of the refrigerator (607), as previously shown and described in association with FIGS. 4~5. If the hook RFID tag-reading and the data-checking procedure are successful, then the processed carcass corresponding to the hook RFID tag is placed inside the refrigerator (607) for a specified period of time. Subsequently, the processed carcass with the hook RFID tag is taken out of the refrigerator and undergoes a hook RFID tag-reading and data-recording procedure in a data scan zone near an exit door of the refrigerator (607), as also previously shown and described in association with FIGS. 4~5.

Continuing with FIG. 6, the processed carcass with the hook RFID tag, which is taken out of the refrigerator (607), is then transported (i.e. 609) to a meat-packing facility (611), where meat-chopping and meat-packing operations are performed. In a preferred embodiment of the invention, the information pairing between the hook RFID tag and one or more corresponding package labels is also performed during or after meat-chopping and meat-packing operations inside the meat-packing facility (611). When all desirable or necessary operations are completed from the meat-packing facility (611), packaged meat products can then be transported (i.e. 613) to other meat processing facilities or distribution channels.

Figure 7:
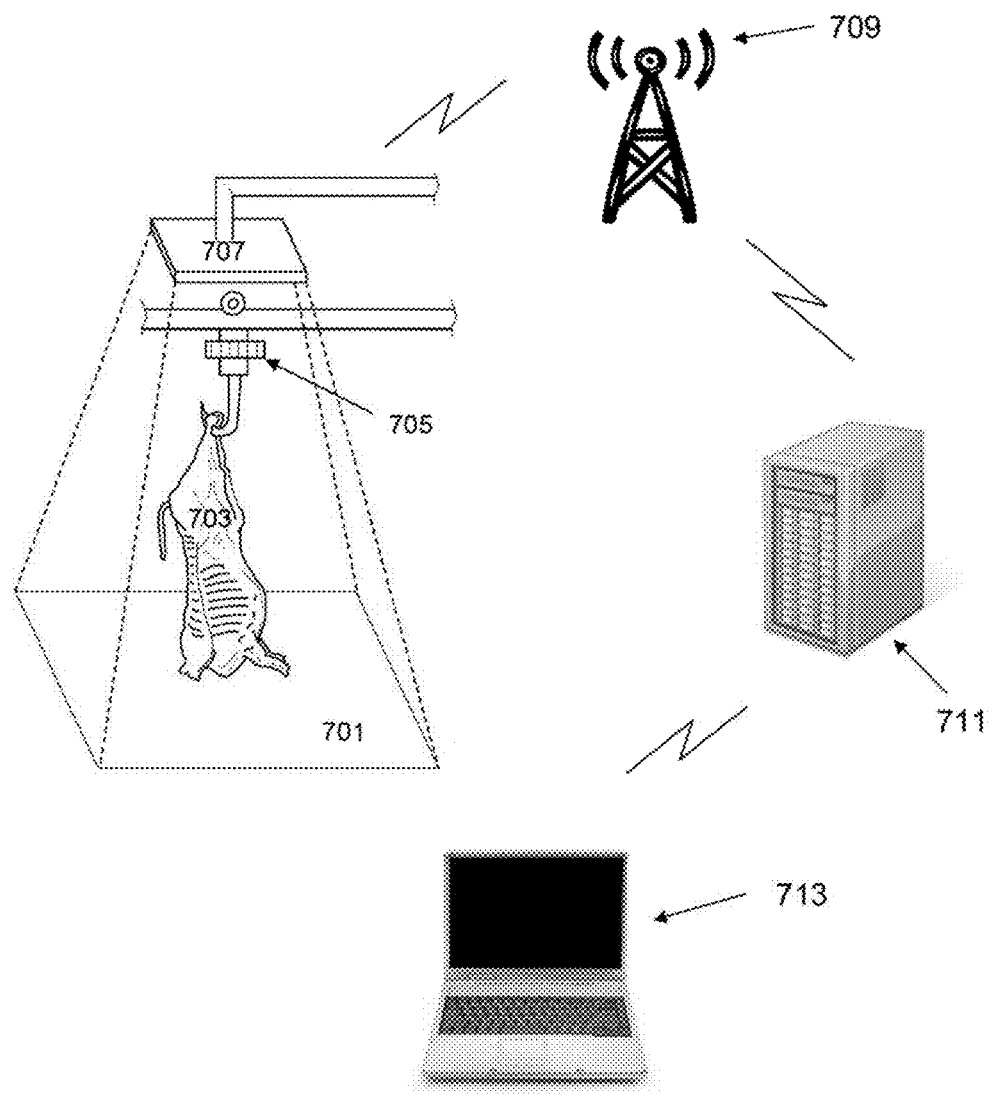
FIG. 7 shows a high-level device connection for a food source information transferring system in accordance with an embodiment of the invention.

FIG. 7 shows a high-level device connection (700) for a food source information transferring system in accordance with an embodiment of the invention. In a preferred embodiment of the invention, the food source information transferring system includes an RFID reader with an integrated or discrete RF antenna (707), which define a data scan zone (701). The RFID reader with an integrated or discrete RF antenna (707) is operatively connected to a computer server (711) or another computer system device via a wireless data connection (709), a wired data connection, or a combination thereof. In the preferred embodiment of the invention, the computer server (711) is configured to operate a food source information database which can be executed on a CPU and a memory unit of the computer server (711).

The food source information database can utilize information read from a livestock RFID tag on a carcass (703) and a hook RFID tag (705) incorporated in a hook. For example, the food source information database can pair and store the data associated with tag-identifying information in the livestock RFID tag and the data associated with tag-identifying information in the hook RFID tag (705) to create and maintain a robust set of food source information for the carcass (703) in the food source information database. The food source information database may already contain some specific food source information for livestock animals that are identifiable by tag-identifying information of livestock RFID tags, prior to the pairing of data with the data associated with tag-identifying information in the hook RFID tag (705).

Continuing with FIG. 7, the computer server (711) in the food source information transferring system is also operatively connected to a user display terminal (713) or a computer display that displays useful information to a system user. As previously shown in FIG. 1 and FIG. 4, a display panel (e.g. 105 of FIG. 1, or 407 of FIG. 4) can be also operatively connected to the food source information transferring system. In the preferred embodiment of the invention, a keyboard, a keypad, an operation controller, or another user input method is operatively connected to the user display terminal (713) or the computer display for retrieving and controlling information associated with the food source information database.

Figure 8:
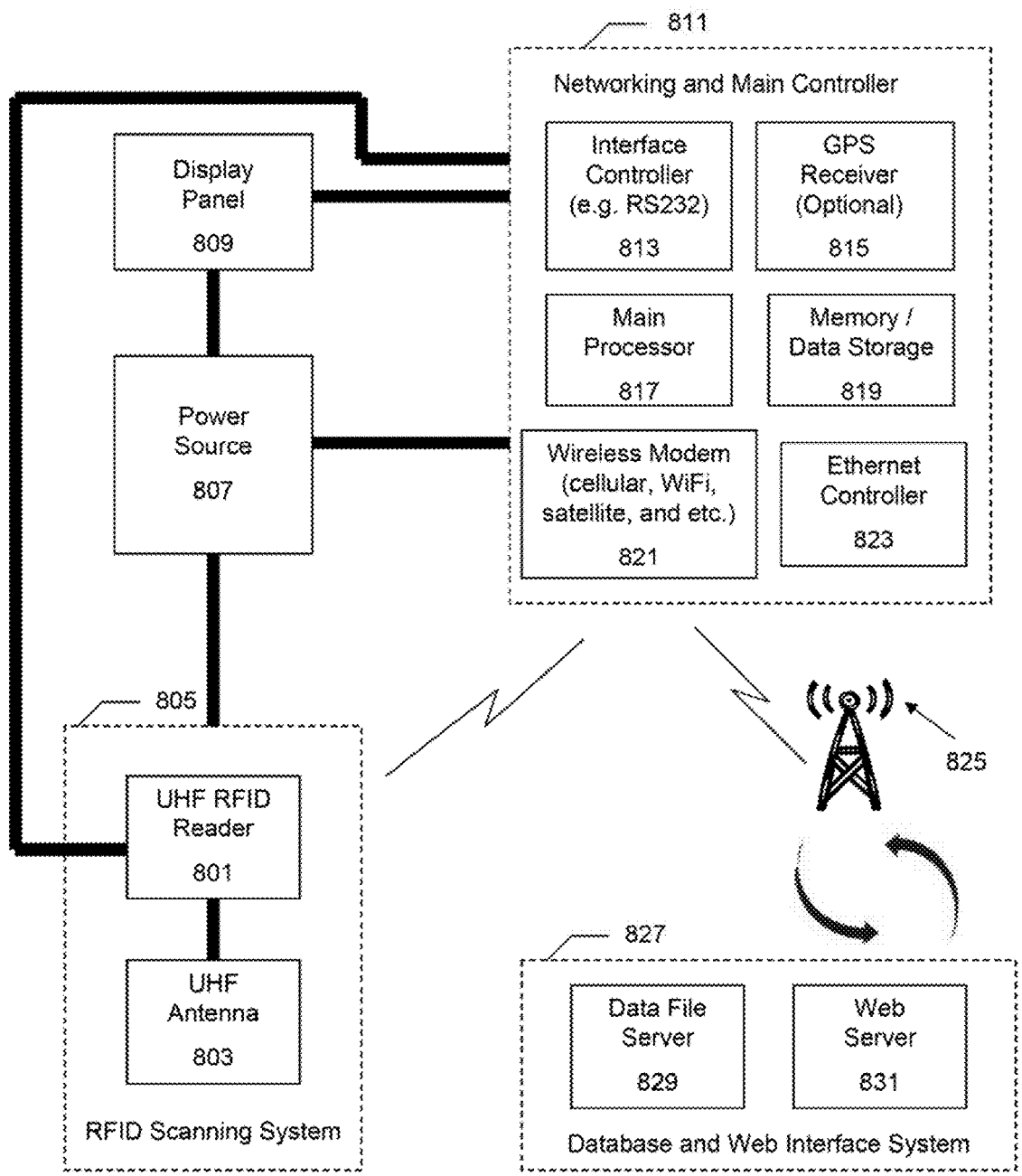
FIG. 8 shows a food source information transferring system in accordance with an embodiment of the invention.

FIG. 8 shows a food source information transferring system (800) in accordance with an embodiment of the invention. In a preferred embodiment of the invention, the food source information transferring system comprises a networking and main controller system (811), an RFID scanning system (805), a power source (807), a display panel (809), a wireless and/or wired communication network (825), and a database and web interface system (827). In the preferred embodiment of the invention, a first RFID scanning system (e.g. 805 in FIG. 8, or 107, 121, and 125 in FIG. 1) and a corresponding display panel (e.g. 809 in FIG. 8, or 105 in FIG. 1) may be installed in a slaughterhouse, as shown in FIG. 1. Furthermore, a second RFID scanning system (e.g. 805 in FIG. 8, or 405 and 423 in FIG. 4) and a corresponding display panel (e.g. 809 in FIG. 8, or 407 in FIG. 4) may be installed inside or near a refrigerator.

In one embodiment of the invention, the power source (807) may be provided by an electrical outlet, a battery, an alternative energy generator such as a wind turbine or a solar panel, or a combination thereof. The power source (807) is configured to provide electrical power to the RFID scanning system (805) and the display panel (809). The networking and main controller (811) may be operatively connected to the same power source (807) or a different power source. Furthermore, the display panel (809) and the RFID scanning system (805) are operatively connected to the networking and main controller (811) for data communication, which can be accomplished by wireless and/or wired communication methods.

Continuing with FIG. 8, in one embodiment of the invention, the RFID scanning system (805) comprises a UHF RFID tag reader (801) operatively connected to a UHF antenna (803), which enables and defines a data scan zone, as described in FIGS. 1 and 4 previously. Furthermore, in one embodiment of the invention, the networking and main controller system (811) comprises an interface controller (813), a main processor (817), a memory unit and a data storage (819), a wireless modem (821), an Ethernet controller (823), and optionally a GPS receiver (815). The networking and main controller system (811) is designed to control and manage the display panel (809), the power source (807), and the RFID scanning system (805). Moreover, the networking and main controller system (811) can retrieve, store, change, and manage food source information data from a food source information database operating in the database and web interface system (827), and also from an RFID tag read in the data scan zone from the RFID scanning system (805).

In one embodiment of the invention, at least some portions of the networking and main controller system (811) is a portable unit, wherein the portable unit is capable of communicating with the RFID scanning system (805), the display panel (809), and the database and web interface system (827) via a local area network (LAN), an Internet connection, and/or a wired or wireless data connection using the Ethernet controller (823), the wireless modem (821), and the interface controller (813) of the networking and main controller system (811). In a preferred embodiment of the invention, the portable unit utilizes RS232 or RS485 communication interfaces (e.g. 813) to communicate with at least some parts of the food source information transferring system. Furthermore, the GPS receiver (815) may assist identifying the current location of the portable unit or another device unit relative to the RFID scanning system (805) and the database and web interface system (827). In another embodiment of the invention, the networking and main controller system (811) may be entirely a fixed unit attached to one particular location, such as a wall of a building or a device system tower.

Furthermore, some features of the networking and main controller system (811) include, but are not limited to, executing an application program on the microprocessor (817) and the memory and the data storage unit (819) to access RFID tag data from the data scan zone, and a user interface (e.g. a keypad, a keyboard, buttons, switches, and etc. on the networking and main controller unit (811)) to control and manage operations of the RFID scanning system (805), the power source (807), the display panel (809), and at least some features in the database and web interface system (827) such as data retrieval or recording in the food source information database.

Continuing with FIG. 8, in a preferred embodiment of the invention, the database and web interface system (827) comprises a data file server (829) and a web server (831), which may be separate computer server units or a combined integrated computer server unit. The data file server (829) may function as a network attached storage (NAS) that stores and updates food source information data associated with a livestock tag or a hook RFID tag. Preferably, a CPU and a memory unit of the data file server (829) operates the food source information database. Furthermore, the web server (831) may store and operate an Internet application module to provide a user interface to control, manage, and/or visualize data or control interfaces associated with the food source information transferring system and the food source information database. This user interface may be accessed by a computer terminal, a mobile device, or a networking and main controller system (e.g. 811).

FIG. 9 shows an example of a first set of data (900) associated with a livestock tag, and an example of a second set of data (915) associated with a hook RFID tag, in accordance with an embodiment of the invention. In the example as shown in FIG. 9, the first set of data (900) includes tag-identifying information for the livestock tag called "Livestock Tag ID" (901). This tag-identifying information, such as an alphanumeric code "A618208," as shown in FIG. 9, can be what is stored in a livestock RFID tag, which is read by an RF antenna and an RFID reader in a data scan zone. In the preferred embodiment of the invention, the tag-identifying information can be dynamically associated with detailed livestock farm or producer-level livestock information, such as meat type (903), date of birth (905) for the livestock animal, gender (907), owner's name or identity (909), vaccine records (911), weight of the animal (913), and any other pertinent information.

These detailed livestock farm or producer-level livestock information may have been recorded in a food source information database when a livestock RFID tag was scanned during the growth years for the livestock RFID tag attached to the livestock animal. In an alternate embodiment of the invention, the livestock RFID tag may also store at least some of the detailed information (e.g. 903, 905, 907, 909, 911, 913, and etc.) in its non-volatile memory unit, regardless of the dynamic association of the detailed livestock farm or producer-level livestock information in the food source information database.

Continuing with FIG. 9, in the example as shown in FIG. 9, the second set of data (915) associated with a hook RFID tag includes tag-identifying information called "Hook RFID Tag ID" (917). This tag-identifying information for the hook RFID tag, such as an alphanumeric code "C200402" as shown in FIG. 9, can be what is stored in the hook RFID tag, which is read by the RF antenna and the RFID reader in the data scan zone. In the preferred embodiment of the invention, the tag-identifying information can be dynamically associated with slaughterhouse-specific information such as slaughterhouse or plant ID (919), and also be paired with a specific livestock tag ID (921) (e.g. A618208) and status information (923), which may indicate status information such as "no carcass," "unsuccessful data pairing," and "duplicated pairing attempt," as explained previously for FIG. 3. The second set of data (915) associated with the hook RFID tag can be stored and maintained by the food source information database. In an alternate embodiment of the invention, the hook RFID tag may also store at least some of the detailed information (e.g. 919, 921, 923, and etc.) in its non-volatile memory unit, regardless of the dynamic association of the slaughterhouse-specific information and data pairing with the first set of data (900) in the food source information database.

Figure 10:
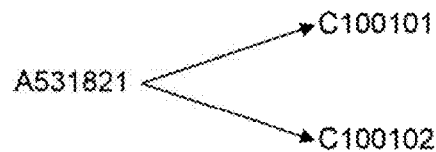
FIG. 10 shows a data association example of a livestock tag and hook RFID tags, and a data association example of multiple livestock tags and hook RFID tags, in accordance with an embodiment of the invention.
Figure 10:
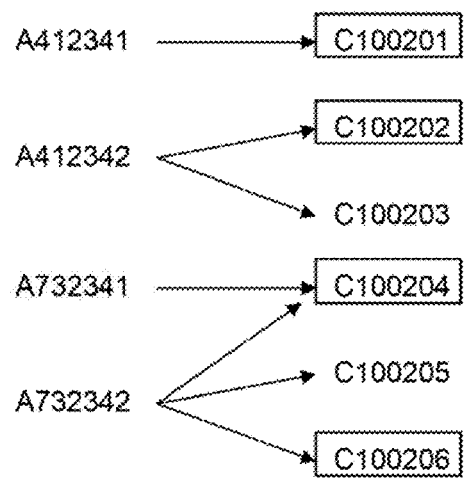

FIG. 10 shows two examples (1000) of data pairing, each example of which associates one set of data to another set of data, in accordance with an embodiment of the invention. A first data association example (1001A) shows pairing of a single livestock tag with a plurality of hook RFID tags. In this particular case, the single livestock tag has alphanumeric code "A531821" as tag-identifying information. If an animal carcass identified by this single livestock tag is divided into two pieces and hung in two separate hooks in a slaughterhouse processing operation, then two hook RFID tags with hook RFID tag ID's "C100101" and "C100102" are dynamically paired (i.e. associated) with the single livestock tag "A531821" in a food source information database. In a preferred embodiment of the invention, once a livestock tag ID is paired with one or more hook RFID tags, any underlying data associated with either of the tags also get dynamically associated in the food source information database.

Furthermore, FIG. 10 also shows a second data association example (1001B) that pairs a plurality of livestock tags with a plurality of hook RFID tags. In this particular case, four livestock tags with alphanumeric codes "A412341," "A412342," "A732341," and "A732342" are shown as tag-identifying information. The second data association example shows several possibilities of paired correlation among livestock tags and hook RFID tags. For example, the first livestock tag, A412341, has a one-to-one correspondence to a first hook RFID tag, C100201. This suggests that the animal carcass associated with the first livestock tag, A412341, is held or represented by a single hook incorporating the first hook RFID tag, C100201. Unlike the first livestock tag, the second livestock tag, A412342, corresponds to two hook RFID tags, C100202 and C100203. This suggests that the animal carcass associated with the second livestock tag, A412342, is held or represented by two hooks incorporating the two hook RFID tags, C100202 and C100203.

Furthermore, in the second data association example (1001B), the third livestock tag, A732341, corresponds to a single hook RFID tag, C100204, but the fourth livestock tag, A732342, also partially corresponds to the same single hook RFID tag, C100204. This means that one hook that incorporates C100204 as its hook RFID tag holds or represents an animal carcass represented by the third livestock tag, A732341, and also additionally holds or represents part of another animal carcass represented by the fourth livestock tag, A732342. In this example, the remaining portion of the animal carcass represented by the fourth livestock tag, A732342, is also distributed to the last two hooks incorporating C100205 and C100206 as hook RFID tags.

As shown by the second data association example (1001B), in some slaughterhouse and other meat processing operations, it may be desirable to divide a single body of animal carcass into multiple pieces and use a plurality of hooks to hold those multiple pieces. Furthermore, it may also be desirable to enable a single hook to hold multiple pieces of a plurality of animal carcasses. In all of such situations, one or more embodiments of the present invention are able to pair, associate, record, retrieve, and manage a variety of singular or multiple correlations between livestock tags and hook RFID tags using a food source information transferring system and a related database.

Moreover, in one embodiment of the invention, rectangles surrounding four hook RFID tags, C100201, C100202, C100204, and C100206, represent the four corresponding hooks that hold specific parts of multiple animal carcasses, such as cows' ribeye parts or cows' sirloin parts, that can be packed into a single meat package at a later stage of meat processing. For example, a "sirloin" meat package may contain sirloin parts from a multiple number of cows that correspond to a multiple number of hook RFID tags and a multiple number of livestock tags. In such situations, one or more embodiments of the present invention can pair, associate, record, retrieve, and manage such complex correlations between livestock tags and hook RFID tags using a food source information transferring system and a related database.

Figure 11:
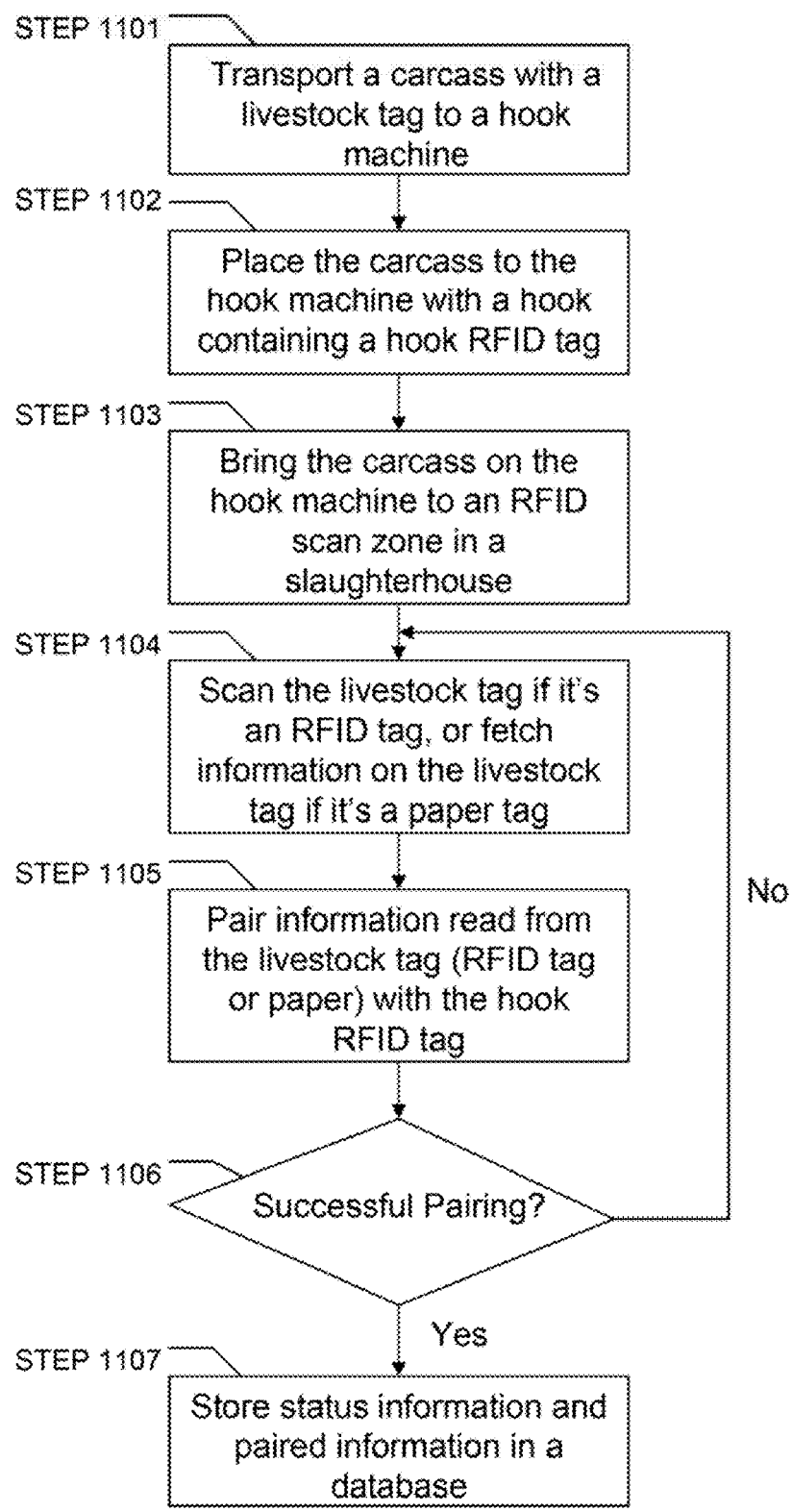
FIG. 11 shows a flowchart for a method of food source information transfer and storage in a livestock slaughterhouse in accordance with an embodiment of the invention.

FIG. 11 shows a flowchart (1100) for a method of food source information transfer and storage in a livestock slaughterhouse using a food source information transferring system in accordance with an embodiment of the invention. In a preferred embodiment of the invention, a carcass with a livestock tag attached to its body is first transported to a hook machine in a slaughterhouse, as shown in STEP 1101. Then, a hook containing a hook RFID tag is first attached to the carcass, and the hook is subsequently hung on the hook machine that can conveniently mobilize the carcass, as shown in STEP 1102. Then, the carcass on the hook machine is brought to an data scan zone to access information in the livestock tag and the hook RFID tag, as shown in STEP 1103 and also previously shown in FIG. 1. If the livestock tag is an RFID livestock tag, then an RF antenna and an RFID reader can scan the information in the RFID livestock tag, as shown in STEP 1104. If the livestock tag is a paper livestock tag, then any information on the paper livestock tag is manually or automatically transcribed, fetched, or entered into the food source information transferring system, as also shown in STEP 1104.

Once livestock tag information is correctly scanned, transcribed, fetched, and/or entered into the food source information transferring system at the data scan zone in the slaughterhouse, then the hook RFID tag is also scanned by the RF antenna and the RFID reader, after which the information from the livestock tag and the hook RFID tag are attempted to be paired, associated, and/or linked, as shown in STEP 1105. If the data pairing, association, and/or linking are determined to be successful by the food source information transferring system, as shown in STEP 1106, then status information and paired data are stored in a food source information database, as shown in STEP 1107. On the other hand, if the data pairing, association, and/or linking are determined to be unsuccessful by the food source information transferring system, then STEP 1104 and STEP 1105 can be repeated as a reattempt to read and pair information from the livestock tag and the hook RFID tag, as shown in STEP 1106.

Various embodiments of the food source information transferring system and related methods for a livestock slaughterhouse have been illustrated in FIGS. 1~11 and described above. The present invention provides numerous advantages over conventional food source information tracking systems or methods. By utilizing a concept of a novel hook RFID tag which is incorporated in a hook configured to be hung on a hook machine, various embodiments of the present invention enable a seamless and convenient transfer of food source information data from a first set of data associated with livestock farm or producer-level information identified by a livestock tag to a second set of data associated with a particular hook holding a particular carcass in the livestock slaughterhouse.

Furthermore, the novel pairing of information between the livestock tag and the hook RFID tag as embodied by various embodiments of the invention can be designed to be automated and lossless, thereby ensuring that all of the detailed information associated with the livestock tag, such as date of birth, gender, original livestock owner, vaccine records, and animal weight, are retained in subsequent meat processing, packing, distribution, and sales operations. The lossless and secure retention of detailed food source information at every stage of livestock farming, meat processing, packing, distribution, and sales operations ensures that any meat-related problems, diseases, epidemic, and/or quality control can be readily identified and managed by appropriate authorities and governing entities.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A food source information transferring system for a livestock slaughterhouse, the food source information transferring system comprising:
a data scan zone defined by an RFID signal projection from an RF antenna operatively connected to an RFID reader;
a hook that holds multi-carcass grouped meat parts derived from a multiple number of animal carcasses, wherein the multi-carcass grouped meat parts hung on the hook embed a multiplicity of livestock RFID tag information corresponding to the multiple number of animal carcasses;
a hook RFID tag incorporated or embedded in the hook that holds the multi-carcass grouped meat parts derived from the multiple number of animal carcasses, when the hook is hung on a hook machine, wherein the hook machine is designed to transport the multi-carcass grouped meat parts on the hook from one location to another location;
the RFID reader reading from the hook RFID tag and the multi-carcass grouped meat parts embedding the multiplicity of livestock RFID tag information corresponding to the multiple number of animal carcasses, when the hook RFID tag is inside the data scan zone;
a food source information database operating on a CPU and a memory unit of a computer system device which is operatively connected to the RFID reader, wherein the food source information database pairs the multiplicity of livestock RFID tag information in the multi-carcass grouped meat parts per hook with the hook RFID tag, so that a multi-carcass source-to-single hook data correlation is traceably established; and
a slaughterhouse operation controller unit operatively connected to the RFID reader and the food source information database, wherein the slaughterhouse operation controller unit at least partially controls the RFID reader and the food source information database.

2. The food source information transferring system of claim 1, further comprising a display panel operatively connected to the slaughterhouse operation controller unit, wherein the display panel shows a current status of data pairing between the multiplicity of livestock RFID tag information in the multi-carcass grouped meat parts per hook with the hook RFID tag.

3. The food source information transferring system of claim 1, further comprising indicator lights surrounding the data scan zone, wherein the indicator lights are activated if the hook RFID tag and/or the livestock RFID tag are within the data scan zone defined by the RFID signal projection from the RF antenna.

4. The food source information transferring system of claim 1, further comprising a wireless transceiver operatively connecting the RFID reader and the computer system device executing the food source information database in its CPU and its memory unit for data communication.

5. The food source information transferring system of claim 1, wherein the multiplicity of livestock RFID tag information in the multi-carcass grouped meat parts per hook includes type of meat, date of birth, gender, farm owner identification, vaccine record, weight of an animal, and/or other livestock farm producer-level information.

6. The food source information transferring system of claim 1, wherein the hook RFID tag includes slaughterhouse identification, paired livestock tag identification, pairing status information, and/or other slaughterhouse-level meat-processing information.

7. The food source information transferring system of claim 1, wherein the slaughterhouse operation controller unit is also a networking and main controller of the food source information transferring system.

8. The food source information transferring system of claim 1, further comprising a power source unit operatively connected to the RFID reader, the RF antenna, and the slaughterhouse operation controller unit.

9. The food source information transferring system of claim 1, wherein the computer system device executing the food source information database on its CPU and its memory unit comprises one or more computer servers that function as a data file server.

10. The food source information transferring system of claim 1, further comprising a user interface device operatively connected to the computer system device for data retrieval, recordation, and management related to the food source information database.

11. The food source information transferring system of claim 1, wherein the hook RFID tag is a battery-less passive tag, and wherein the hook RFID tag comprises a non-volatile memory unit and an embedded RF antenna unit.

12. The food source information transferring system of claim 1, further comprising a refrigerator with a second RF antenna defining a second data scan zone near an entrance or an exit of the refrigerator, wherein the second RF antenna is operatively connected to a second RFID reader and the food source information database.

13. The food source information transferring system of claim 12, wherein the second RF antenna and the second data scan zone enable data retrieval from or data recordation to the food source information database when hook RFID tags are accessed in the second data scan zone due to inbound or outbound hooked animal carcasses.

14. The food source information transferring system of claim 12, further comprising a second display panel attached to a wall of the refrigerator, wherein the second display panel shows a hook RFID identification number or alphanumeric code of a currently-accessed hook RFID tag in the second data scan zone, and also shows an inbound or outbound direction of the currently-accessed hook RFID tag.

15. A method of transferring food source information from livestock producer-level food source data to slaughterhouse-level food source data, the method comprising the steps of:
transporting multi-carcass grouped meat parts derived from a multiple number of animal carcasses to a hook machine, wherein the multi-carcass grouped meat parts embed a multiplicity of livestock RFID tag information corresponding to the multiple number of animal carcasses;
placing the multi-carcass grouped meat parts to the hook machine with a hook containing a hook RFID tag;
bringing the multi-carcass grouped meat parts on the hook machine to a data scan zone in a slaughterhouse;
reading the multi-carcass grouped meat parts embedded with the multiplicity of livestock RFID tag information with an RF antenna and an RFID reader operatively connected to a food source information database;
reading the hook RFID tag with the RF antenna and the RFID reader operatively connected to the food source information database;
pairing the multiplicity of livestock RFID tag information in the multi-carcass grouped meat parts per hook with the hook RFID tag, so that a multi-carcass source-to-single hook data correlation is traceably established; and
when the pairing of the multiplicity of livestock RFID tag information in the multi-carcass grouped meat parts per hook with the hook RFID tag is determined to be successfully completed, storing a status code and the paired information in the food source database.

16. The method of claim 15, wherein the status code includes status code definitions that are functionally equivalent to indicating "no carcass," "unsuccessful data pairing," and "duplicated pairing attempt."

17. The method of claim 15, wherein the food source database is executed on a CPU and a memory unit of a computer system device operatively connected to the RFID reader and the RF antenna.

18. The method of claim 15, wherein the multiplicity of livestock RFID tag information in the multi-carcass grouped meat parts per hook includes tag-identifying information which are dynamically associated with type of meat, date of birth, gender, farm owner identification, vaccine record, weight of an animal, and/or other livestock farm producer-level information stored in the food source information database.

19. The method of claim 15, wherein the hook RFID tag includes tag-identifying information which are dynamically associated with slaughterhouse identification, paired livestock tag identification, pairing status information, and/or other slaughterhouse-level meat-processing information.

* * * * *